April 28, 1936.  L. F. SCHWARZ  2,039,193
PHOTOGRAPHIC APPARATUS
Filed May 17, 1934  2 Sheets-Sheet 1
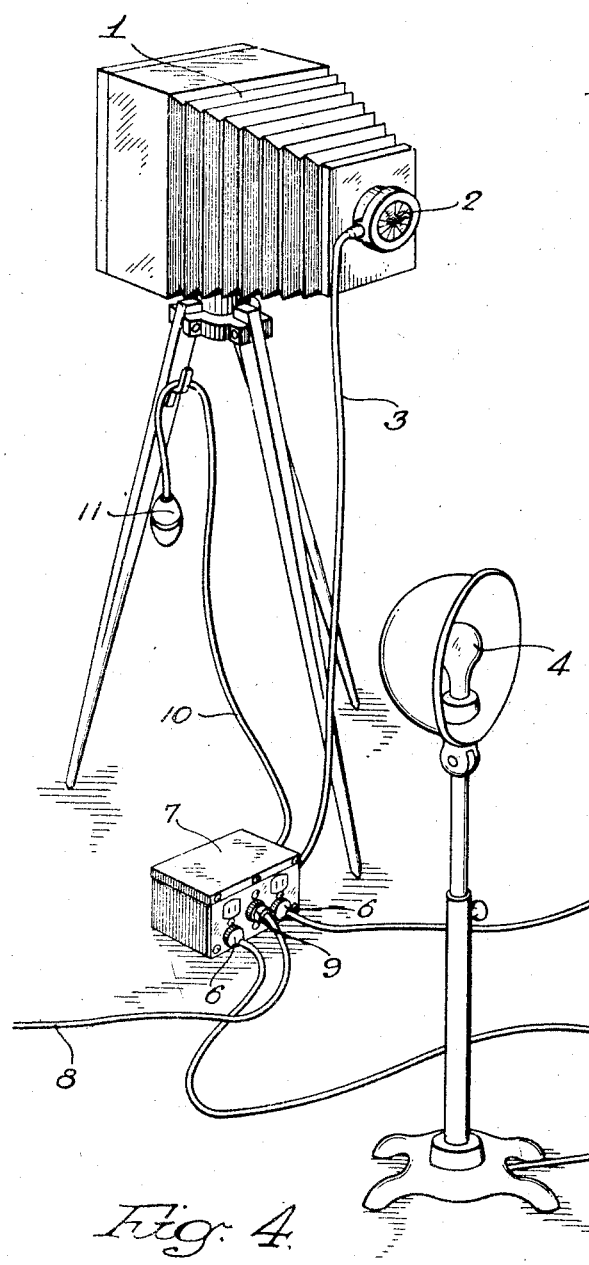
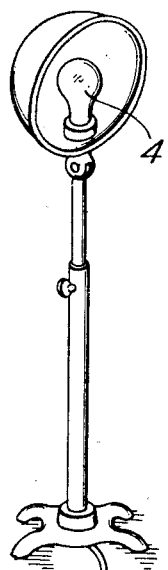
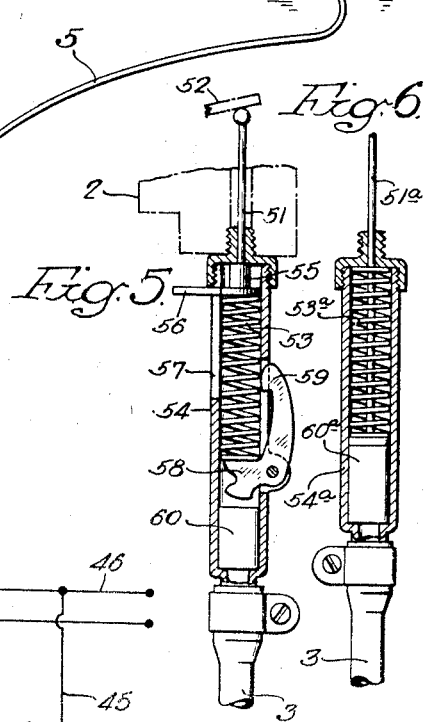
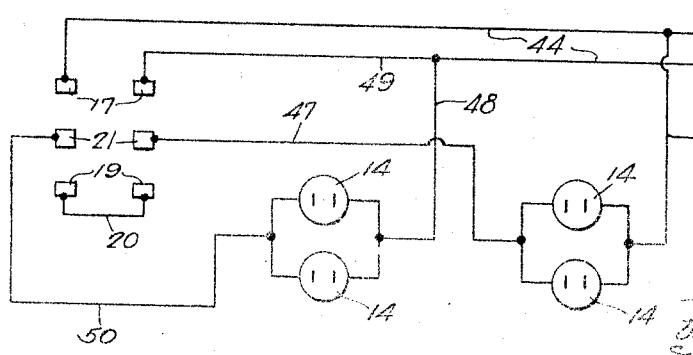
Inventor:
Louis F. Schwarz
by his Attorneys April 28, 1936.  L. F. SCHWARZ  2,039,193
PHOTOGRAPHIC APPARATUS
Filed May 17, 1934   2 Sheets-Sheet 2

Inventor:
Louis F. Schwarz
by his Attorneys
Howson & Howson

UNITED STATES PATENT OFFICE 2,039,193

PHOTOGRAPHIC APPARATUS

Louis F. Schwarz, Oaklyn, N. J.

Application May 17, 1934, Serial No. 726,141

6 Claims. (Cl. 240—2)

This invention relates to flash-light photography and has for its principal object the provision of improved apparatus for taking flash-light pictures with the modern electric lamps which have been developed for this purpose.

Generally, it is the purpose of the invention to provide for simultaneous operation of the camera shutter and flash exposure of the photographic plate and, while this general purpose is not new, I provide, by this invention, novel apparatus having certain important features and advantages, as will appear more clearly hereinafter.

An object of the invention, therefore, is to provide a unitary device comprising an electric switch adapted to control the flash-producing lamp or lamps, and pneumatically-operable means preferably in the form of an ordinary compressible bulb arranged to actuate the switch at the same time that the shutter is operated pneumatically.

Another object of the invention is to provide a device of this nature having means for adjusting or varying the operation of the switch to adapt the device for use with different cameras.

A further object of the invention is to provide in such a device means for preventing operation of the switch to enable ready focusing of certain types of cameras, while the apparatus is connected and ready to take the picture.

Other objects and features of the invention will be apparent hereinafter. In the drawings:

Fig. 1 is a view illustrating in perspective the various elements of the apparatus connected together and ready to take a picture;

Fig. 4 is a schematic diagram of the electrical circuits of the device; and

Figs. 5 and 6 are sectional views of different forms of an adapter for use with certain types of cameras.

Figure 2:
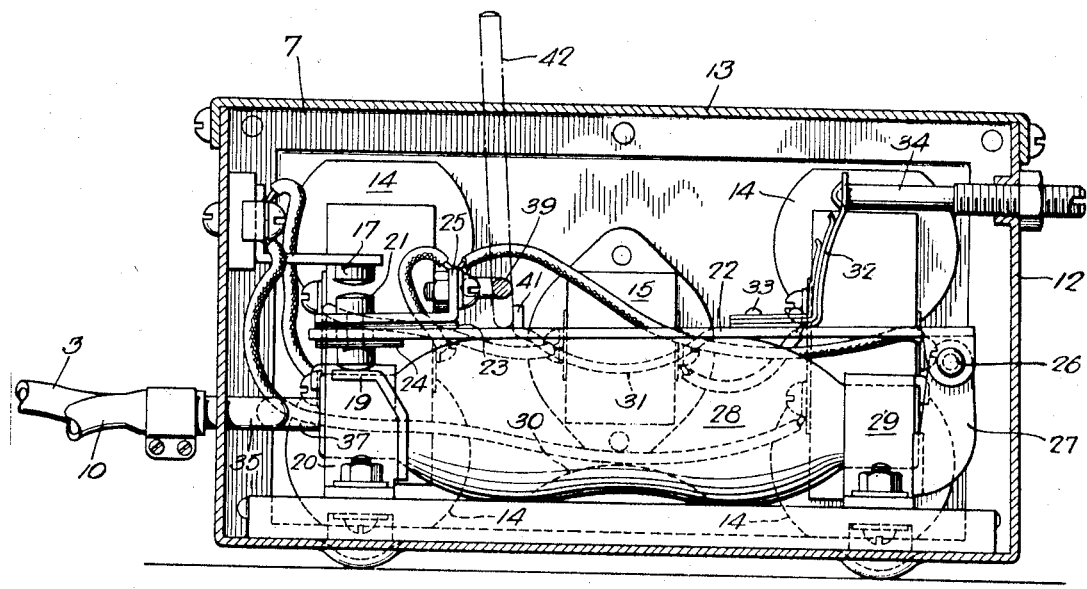
Fig. 2 is a sectional view of the unitary device forming an essential part of the invention taken along line 2—2 of Fig. 3.

Referring particularly to Fig. 1 of the drawings, there is shown at 1 a camera of conventional construction having the usual shutter 2 adapted for pneumatic operation. To this end, the air hose or tube 3 is connected to the shutter-actuating mechanism as well known. Lamps 4 are modern electric lamps of the type adapted to produce a flash exposure for photographic purposes. These lamps are connected by extension conductors 5 and conventional plugs 6 to device 7, which will be fully described hereinafter. Conductor cord 8 is connected to a suitable source of electrical energy (not shown) and to device 7 by means of the conventional receptacle 9. The purpose of device 7 is to actuate the camera shutter and the lamps simultaneously during the taking of a picture. The device functions pneumatically and there is, therefore, provided a common air hose or tube 10 leading to device 7 and having at its end an ordinary compressible bulb 11.

Figure 3:
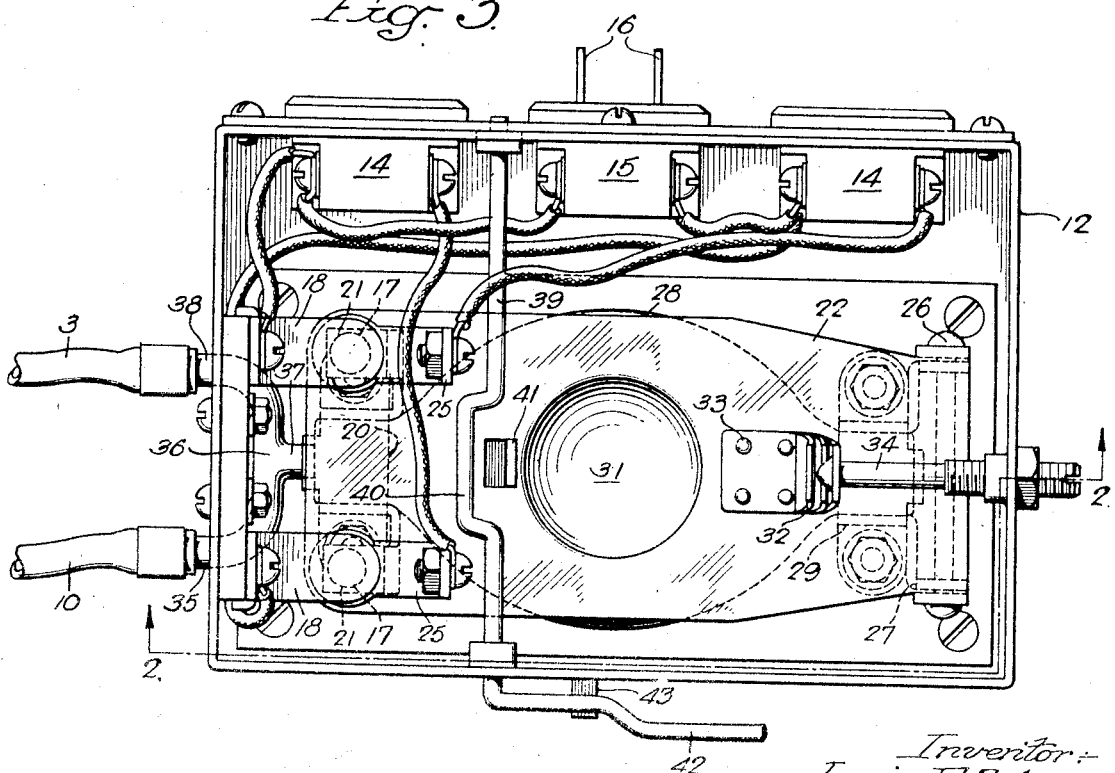
Fig. 3 is a plan view of the same device with the cover thereof removed.

Referring now to Figs. 2 and 3, wherein device 7 is shown in detail, this device comprises a casing 12 having a removable cover 13. Within the casing, all of the various elements about to be described are compactly mounted and the device is unitary and portable. Mounted in a side wall of the device, as shown clearly in Figs. 1 and 3, are suitable receptacles 14 adapted to receive the plugs 6 and a plug 15 having prongs 16 adapted for direct connection to an outlet receptacle, or a receptacle, such as receptacle 9, at the end of an extension cord. These electrical connector elements are connected to a switch in a manner which will be described later. The switch comprises an upper pair of stationary contacts 17 carried by brackets 18, a lower pair of stationary contacts 19 connected together by a metallic strap 20 and a pair of movable contacts 21 carried by a pivotally mounted plate 22. The movable contacts comprise buttons on each side of plate 22 which are adapted to engage the upper and lower stationary contacts respectively. These buttons are electrically connected by portions of the movable contacts extending through the plate 22, as shown in Fig. 2. The movable contacts are insulated from the metallic plate 22 by suitable insulating spacers 23 and 24. Brackets 25 serve as terminals for the movable contact elements to which electrical conductors may be connected.

Plate 22 is pivotally attached at 26 to a supporting bracket 27. A compressible bulb 28, which may be formed of rubber, is arranged in cooperative relation with the movable plate. Strap 20, in addition to electrically connecting the lower stationary contacts of the switch, also clamps one end of the bulb. A similar strap 29 clamps the other end of the bulb. The bulb rests upon the upwardly-projecting spherical surface 30 and directly opposite that surface the plate 22 is dished to provide the downwardly-extending spherical surface 31. These two opposed surfaces compress the bulb so as to drive at least part of the air therefrom.

Plate 22 is urged downward by a leaf-spring 32 which has its lower end connected to the plate at 33 and its upper end in engagement with an adjusting stud 34. This stud is screw-threaded into an end wall of the casing and its outer projecting end is slotted, as clearly illustrated, to provide for manual adjustment. It will be seen that adjustment of the stud will vary the tension of spring 32, which, in turn, will exert a varying force upon plate 22. With plate 22 in its normal downward position, the switch will be closed at its lower stationary contacts, as illustrated clearly in Fig. 2. When air is forced into bulb 28, however, the bulb will expand and will raise plate 22 against the action of spring 32 to open the switch at its lower stationary contacts and close the same at its upper stationary contacts. The air inlet tube 35 is adapted for connection to tube 10, as clearly illustrated, and divides at 36 into branches 37 and 38. Branch 37 leads to bulb 28, while branch 38 is adapted for connection to tube 3.

In order to adapt the device for use with certain types of cameras, as will be explained hereinafter, there is provided a rotatable rod 39 extending transversely of the casing and having its ends journaled in the casing side walls. The central part of the rod is bent, as at 40, and this portion is adapted to press against plate 22 to prevent operation of the switch when rod 39 is in effective position. A tongue 41 is turned up from plate 22 and serves as a stop for the bent portion of the rod. At one end, the rod is bent to provide an actuating handle 42. A lug 43 extends outward from the side wall of the casing and serves as a stop for the handle. In the position shown in Fig. 3, rod 39 is ineffective to prevent operation of the switch. When handle 42 is raised, however, to the position shown in broken-line outline in Fig. 2, the bent portion 40 of the rod engages plate 22 and prevents upward movement thereof. The particular use of this feature will be explained later.

Referring now to Fig. 4, the connector plug 15, shown in Fig. 3, serves to connect an electrical source (not shown) to supply line 44 which is connected to the upper stationary contacts of the switch, as clearly illustrated. The lower stationary contacts of the switch are connected together by the strap conductor 20, as above mentioned. There are provided two sets or groups of receptable elements 14. As illustrated, each of these groups comprises a pair of elements connected in parallel relation, one with another. It is to be understood, however, that more than two such elements may be arranged in parallel relation to constitute a group or, if desired, a single element may be used in place of each group.

As viewed in Fig. 4, the right-hand group or pair of receptacle elements is connected by conductor 45 to one of the line conductors 46. The other side of the parallel circuit of these receptacles is connected by conductor 47 to the right-hand movable switch contact 21. The parallel circuit of the left-hand group or pair of receptacle elements 14 is connected at one side by conductor 48 to the other line conductor 49. The other side of this parallel circuit is connected by conductor 50 to the left-hand movable switch contact 21.

When the switch is in its normal lower position, at which time the movable contacts 21 are bridged or connected together by conductor 20, the groups or pairs of receptacle elements are connected in series relation across the supply line 44. The circuit thus completed may be readily traced. When the switch is actuated to its upper position, however, each group or pair of receptacles is connected across the supply line so that the groups or pairs of receptacles are then in parallel relation with each other. The parallel circuits may be readily traced. It is important to note that this simple electrical system is so arranged that there can be no abnormal operation which will cause a short circuit or other condition injurious to the apparatus. By virtue of the desired close spacing of the switch contacts, it is conceivable that the movable plate 22 might be so operated as to cause only one of the movable contacts to be actuated. In other words, considering Fig. 4, let us suppose that the left-hand movable contact remains in engagement with the left-hand lower stationary contact, while the right-hand movable contact moves into engagement with the right-hand upper contact. This will place the right-hand group or pair of receptacles directly across the supply line but will open the circuit of the left-hand group or pair of receptacles. Conversely, actuation of the left-hand movable contact only will place the left-hand group or pair of receptacles across the supply line and will simply open the circuit of the right-hand group or pair of receptacles. Thus, there can be no short-circuiting or other undesired condition.

There are two different types of photographic lamps now available, one type is known as the "photo-flash" and this lamp is provided with a fusible filament which fuses or burns out when a picture is taken so that the lamp is good for one picture only. The other type of lamp is known as the "photo-flood" and this lamp is adapted for the taking of successive pictures. It is so designed that continuous operation at the voltage required for the flash exposure will render the lamp relatively short-lived but operation of the lamp at a voltage of about one-half of the rated voltage will enable the lamp to burn without substantial deterioration of its filament, much the same as the ordinary electric lamp used for lighting purposes.

If it is desired to use the "photo-flash" lamp in connection with the apparatus of this invention, such lamp may be connected to one of the receptacles of either group or pair. If desired, several such lamps may be used provided they are connected only to one group of the receptacles. It will be seen from Fig. 4 that with a lamp or lamps connected to only one group of receptacles and with the switch in its lower position, a circuit through the lamp is not completed because the series circuit above mentioned is open at the other group of receptacles. When the switch is actuated, however, the lamp or lamps are connected across the supply line as above described.

When it is desired to use the "photo-flood" lamp, one or more of these lamps may be used in the same manner as is the photo-flash lamp, or the photo-flood lamps may be connected to both groups of receptacles as illustrated in Fig. 1. Assuming, for example, that a single photo-flood lamp is connected to a receptacle of each group, as shown in Fig. 1, then with the switch in its normal lower position, a series circuit will be maintained through the lamps and each lamp will receive one-half of the line voltage. These lamps may be burned indefinitely in this manner and, when thus used, they have the advantage that they provide illumination during preparation for the taking of the picture. When the switch is actuated, both lamps are connected directly across the line and for the instant of exposure, each of them receives the full line voltage. They are then returned immediately to their series connection and to the lower non-deteriorating voltage. It will be understood, of course, that as many of these lamps may be used in this fashion as there are receptacles in each group.

Generally speaking, there are two types of camera shutters, one known as the "packard" and the other known as the "silent". The packard shutter is provided with two pneumatically operable actuating mechanisms, one for instantaneous exposure and the other for time exposure. In using a camera equipped with such a shutter, in connection with the apparatus of this invention, the instantaneous shutter-actuating mechanism will be connected to device 7. The shutter of the camera may then be actuated for the purpose of focusing the camera by means of the time shutter-actuating mechanism. This will have no affect upon the apparatus and will not cause actuation of the switch.

The silent shutter, however, is equipped with a single shutter-actuating mechanism which will be connected to device 7 in using the apparatus of this invention. It is desirable to have the apparatus all connected and ready to take a picture and to be able to focus the camera without disconnecting device 7 and without causing operation of the switch thereof. This is the purpose of the rotatable rod 40 above described. When the rod is actuated to its effective position, the camera shutter may be opened by compressing bulb 11 without operating the switch because the portion 40 of the rod 39 prevents upward movement of the movable switch contacts as above explained.

Some cameras are not provided with pneumatically operable shutters but instead are provided with a shutter-actuating mechanism arranged for actuation by a push rod or wire. In the use of these cameras, a flexible tube carrying a push wire or rod is adapted to be connected to the camera shutter-operating mechanism and when the wire is moved longitudinally, the shutter is operated. In Figs. 5 and 6, there are disclosed two forms of an adapter which may be used to adapt such a camera for use with the pneumatically operable apparatus of this invention. Referring to Fig. 5, the adapter is arranged for threaded connection to the camera shutter mechanism as clearly illustrated. The adapter is provided with a push rod 51 which is arranged to actuate the shutter-operating lever 52. A spring 53 is disposed within body 54 of the adapter and is arranged to act upon the member 55 which carries the rod or wire 51. An integral arm 56 of member 55 extends through the wall of the body and is slidable axially of the body in a slot 57 provided in the body wall. The opposite end of the spring is seated on a pivoted latch member 58. The end 59 of the latch member extends through an opening in the body wall, as clearly illustrated. The device is set for operation by moving arm 56 in its slot to compress the spring until the end 59 of the latch member is latched over member 55 and maintains the spring in compressed condition. A plunger 60 functions to release the latch when air is forced through the tube 3 leading to the device. When the latch is tripped or released, the spring moves member 55 forcibly, causing the push wire 51 to actuate the shutter.

In Fig. 6, a similar device is shown which comprises simply a tubular body 54a, a push wire or rod 51a, a plunger 60a connected to the wire, and a spring 53a normally urging the plunger to one end of the tube as shown. When air is forced through the tube 3 connected to the device, the plunger 60a is moved against the action of spring 53a causing actuation of the shutter mechanism by the rod or wire 51a.

Although a preferred form of the invention has been illustrated and described, it will be understood that various modifications are possible. For example, the arrangement of the various elements of device 7 is immaterial provided the desired cooperation between the elements is obtained. Furthermore, the elements themselves may be modified. For example, the pneumatically operable means for actuating the switch may take any desired form, such as a bellows or air cylinder, and is not restricted to a simple bulb as herein disclosed. The other elements are, likewise, capable of modification. It is to be understood, therefore, that the invention is to be limited only by the scope of the appended claims.

I claim:

1. In apparatus of the class described, a unitary device comprising a casing, an electric switch within said casing and provided with means for connection to an external electrical supply line, a plurality of electrical connector elements operatively connected to said casing and adapted for connection to one or more electric lamps outside the casing, means including said switch normally connecting said connector elements in series across said line and operative at will to connect each of said elements across said line in parallel relation, air expansible means within said casing for actuating said switch, and means for conveying air from an external source to said last means.

2. In apparatus of the class described, a device comprising a double-throw electric switch having a pair of stationary contacts, a pair of movable contacts, and a second pair of stationary contacts, means connecting said first pair of contacts to an electrical supply line, means electrically connecting said second pair of stationary contacts together, a pair of electrical connector elements adapted for connection to electric lamps, means connecting one side of each of said connector elements to said supply line and the other side of each of said connector elements to said movable contacts respectively, and means for actuating said movable contacts.

3. In apparatus of the class described, a switch adapted to control light circuits, pneumatically operable means for actuating said switch, a camera shutter operating mechanism, and means for simultaneously supplying air to said means and to said mechanism, said mechanism comprising a push rod means urging said rod to operative position, latch means for normally maintaining said last means in inoperative position, and pneumatically operable means for actuating said latch means to move said rod to operative position.

4. In apparatus of the class described, a unitary device comprising a casing, an electric switch within said casing, means for connecting an electrical supply line to said device, a plurality of groups of electrical connector elements adapted for connection to one or more electric lamps, each said group comprising a plurality of elements connected in parallel one with another, means including said switch normally connecting said groups in series across said line and operative at will to connect each of said groups across said line in parallel relation, air expansible means within said casing for actuating said switch, and means for conveying air to said last means.

5. In apparatus of the class described, a unitary device comprising a casing, an electric switch within said casing, means for connecting an electrical supply line to said switch, a plurality of electrical connector elements adapted for connection to one or more electric lamps, means including said switch normally connecting said elements in series across said line and operative at will to connect each of said elements across said line in parallel relation, air expansible means within said casing for actuating said switch, means for conveying air to said last means, and means operable from outside said casing for preventing actuation of said switch.

6. In apparatus of the class described, a unitary device comprising a casing, an electric switch within said casing, means for connecting an electrical supply line to said switch, a plurality of electrical connector elements adapted for connection to one or more electric lamps, means including said switch normally connecting said elements in series across said line and operative at will to connect each of said elements across said line in parallel relation, air expansible means within said casing for actuating said switch, means for conveying air to said last means, means urging said switch to its said normal position, and means operable from outside said casing for adjusting said last means.

LOUIS F. SCHWARZ.